United States Patent
Ikuma et al.

(10) Patent No.: US 7,808,123 B2
(45) Date of Patent: *Oct. 5, 2010

(54) POWER SUPPLY SYSTEM, MULTIPLE DWELLING, AND COMPUTER PROGRAM

(75) Inventors: Hitoshi Ikuma, Tokyo (JP); Makoto Inoue, Tokyo (JP)

(73) Assignee: The Japan Research Institute, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/398,856

(22) Filed: Mar. 5, 2009

(65) Prior Publication Data

US 2009/0230767 A1 Sep. 17, 2009

Related U.S. Application Data

(63) Continuation of application No. 10/898,639, filed on Jul. 23, 2004, now Pat. No. 7,518,262.

(60) Provisional application No. 60/489,761, filed on Jul. 23, 2003.

(51) Int. Cl.
*H02J 1/10* (2006.01)
*H02J 3/38* (2006.01)
*H02J 7/34* (2006.01)
*H02J 3/06* (2006.01)

(52) U.S. Cl. ........................................................ 307/19
(58) Field of Classification Search ............. 307/18–19, 307/29, 38, 44, 80
See application file for complete search history.

(56) References Cited

U.S. PATENT DOCUMENTS 7,518,262 B2 * 4/2009 Ikuma et al. .................. 307/19

* cited by examiner

*Primary Examiner*—Jared J Fureman
*Assistant Examiner*—Carlos Amaya
(74) *Attorney, Agent, or Firm*—J.C. Patents

(57) ABSTRACT

A power supply system for supplying power to a plurality of loads includes a plurality of fuel cells for generating and supplying power to be supplied to the respectively corresponding loads, wherein the fuel cells are provided to correspond to the plurality of loads, a power network for receiving surplus power, which is generated 'by the fuel cells except power to be supplied to the loads corresponding to the fuel cells, and supplying the surplus power to the loads short of power, wherein the power network is coupled to the plurality of fuel cells, and a control unit for stopping power generation of a first fuel cell among the fuel cells corresponding to a first load among the loads and controlling a second fuel cell among the fuel cells to generate power to be supplied to the first load as the surplus power if an amount of power to be supplied to the first load is less than a predetermined first threshold.

13 Claims, 5 Drawing Sheets

POWER SUPPLY SYSTEM, MULTIPLE DWELLING, AND COMPUTER PROGRAM

CROSS-REFERENCE TO RELATED APPLICATION

This application is a continuation application of, and claims the priority benefit of, U.S. application Ser. No. 10/898,639 filed on Jul. 23, 2004, now U.S. Pat. No. 7,518,262 which claims benefit of U.S. Provisional Application No. 60/489,761, filed on Jul. 23, 2003.

BACKGROUND OF THE INVENTION

1. Field of the Invention

The present invention relates to a power supply system for supplying power to a plurality of loads, a multiple dwelling including the power supply system, and a computer program for allowing the power supply system to be in operation.

2. Description of the Related Art

Conventionally, there is a power supply system of a distribution type in which its power sources are distributed and disposed corresponding to the loads to which power is supplied. In the above power supply system of the distribution type, each of the power sources supplies power to only the corresponding load.

In the conventional power supply system of the distribution type, however, since each of the power sources supplies power to only the corresponding load, it cannot supply power to the corresponding load if it stops working due to a breakdown or maintenance. Moreover, in order to prevent the stoppage of power supply, if each of the loads is always coupled to a power system (hereinafter, referred to as a "system") such as a commercial power supply, the cost of the facilities becomes high. Particularly, if loads in the mountains or isolated islands are supplied with power, the cost for the connection to the system increases significantly.

SUMMARY OF THE INVENTION

Therefore, it is an object of the present invention to provide a power supply system, a multiple dwelling, and a computer program, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a power supply system for supplying power to a plurality of loads includes a plurality of fuel cells for generating and supplying power to be supplied to the respectively corresponding loads, wherein the fuel cells are provided to correspond to the plurality of loads, a power network for receiving surplus power, which is generated by the fuel cells except power to be supplied to the loads corresponding to the fuel cells, and supplying the surplus power to the loads short of power, wherein the power network is coupled to the plurality of fuel cells, and a control unit for stopping power generation of a first fuel cell among the fuel cells corresponding to a first load among the loads and controlling a second fuel cell among the fuel cells to generate power to be supplied to the first load as the surplus power, if an amount of power to be supplied to the first load is less than a predetermined first threshold.

The control unit may control the first fuel cell, of which power generation has been stopped, to generate power to be supplied to the first load and stop the second fuel cell from generating the surplus power, if the surplus power supplied from the power network to the first load is more than a second threshold greater than the first threshold.

The control unit may control a third fuel cell among the fuel cells corresponding to a third load among the loads, which is already in operation, to generate power as the surplus power required for a fourth load among the loads to start to be in operation. In this case, the control unit may control a fourth fuel cell among the fuel cells corresponding to the fourth load to generate power to be supplied to the fourth load and stop the third load from generating the surplus power from the time when a predetermined period elapses after the fourth load starts to be in operation.

The control unit may stop power generation of a fifth fuel cell among the fuel cells corresponding to a fifth load among the loads and control a sixth load among the loads to generate power to be supplied to the fifth load as the surplus power, if an average value of power consumed by the fifth load during a predetermined past period is less than the first threshold.

The control unit may decrease an amount of power generated by a seventh fuel cell among the fuel cells, if the amount of power generated by the seventh fuel cell is more than an average value of power, which has been consumed by a seventh load among the loads corresponding to the seventh fuel cell during a predetermined past period, as much as a predetermined value. The control unit may increase an amount of power generated by an eighth fuel cell among the fuel cells, if an average value of power, which has been received by an eighth load among the loads corresponding to the eighth fuel cell from the power network during a predetermined past period, is more than a predetermined value.

The power supply system may further include a capacitor for storing electric charge equivalent to a portion of the surplus power supplied to the power network except power supplied to the loads and supplying the power stored to the loads if a total amount of power required by the plurality of loads is more than a total amount of power which can be generated by the plurality of fuel cells, wherein the control unit may increase the amount of power generated by the plurality of fuel cells, if the power stored by the capacitor is less than a predetermined value. The power generation efficiency of the plurality of fuel cells may increase according to an amount of power generated by the plurality of fuel cells.

According to the second aspect of the present invention, a computer program for instructing a power supply system to supply power to a plurality of loads, wherein the power supply system includes a plurality of fuel cells for generating and supplying power to be supplied to the respectively corresponding loads, wherein the fuel cells are provided to correspond to the plurality of loads, a power network for receiving surplus power, which is generated by the fuel cells except power to be supplied to the loads corresponding to the fuel cells, and supplying the surplus power to the loads short of power, wherein the power network is coupled to the plurality of fuel cells, and a control unit for stopping power generation of a first fuel cell among the fuel cells corresponding to a first load among the loads and controlling a second fuel cell among the fuel cells to generate power to be supplied to the first load as the surplus power, if an amount of power to be supplied to the first load is less than a predetermined first threshold. The power generation efficiency of the plurality of fuel cells may increase according to an amount of power generated by the plurality of fuel cells.

According to the third aspect of the present invention, a multiple dwelling provided with a plurality of dwelling units includes a plurality of fuel cells for generating and supplying power to be supplied to the respectively corresponding dwelling units, wherein the fuel cells are provided to correspond to the plurality of dwelling units, a power network for receiving surplus power, which is generated by the fuel cells except power to be supplied to the dwelling units corresponding to the fuel cells, and supplying the surplus power to the dwelling units short of power, wherein the power network is coupled to the plurality of fuel cells, and a control unit for stopping power generation of a first fuel cell among the fuel cells corresponding to a first dwelling unit among the dwelling units and controlling a second fuel cell among the fuel cells to generate power to be supplied to the dwelling unit as the surplus power, if an amount of power to be supplied to the first dwelling unit is less than a predetermined first threshold. The power generation efficiency of the plurality of fuel cells may increase according to an amount of power generated by the plurality of fuel cells.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3A shows an example of the amount of power consumed and the amount of power generated, and FIG. 3B shows another example thereof.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
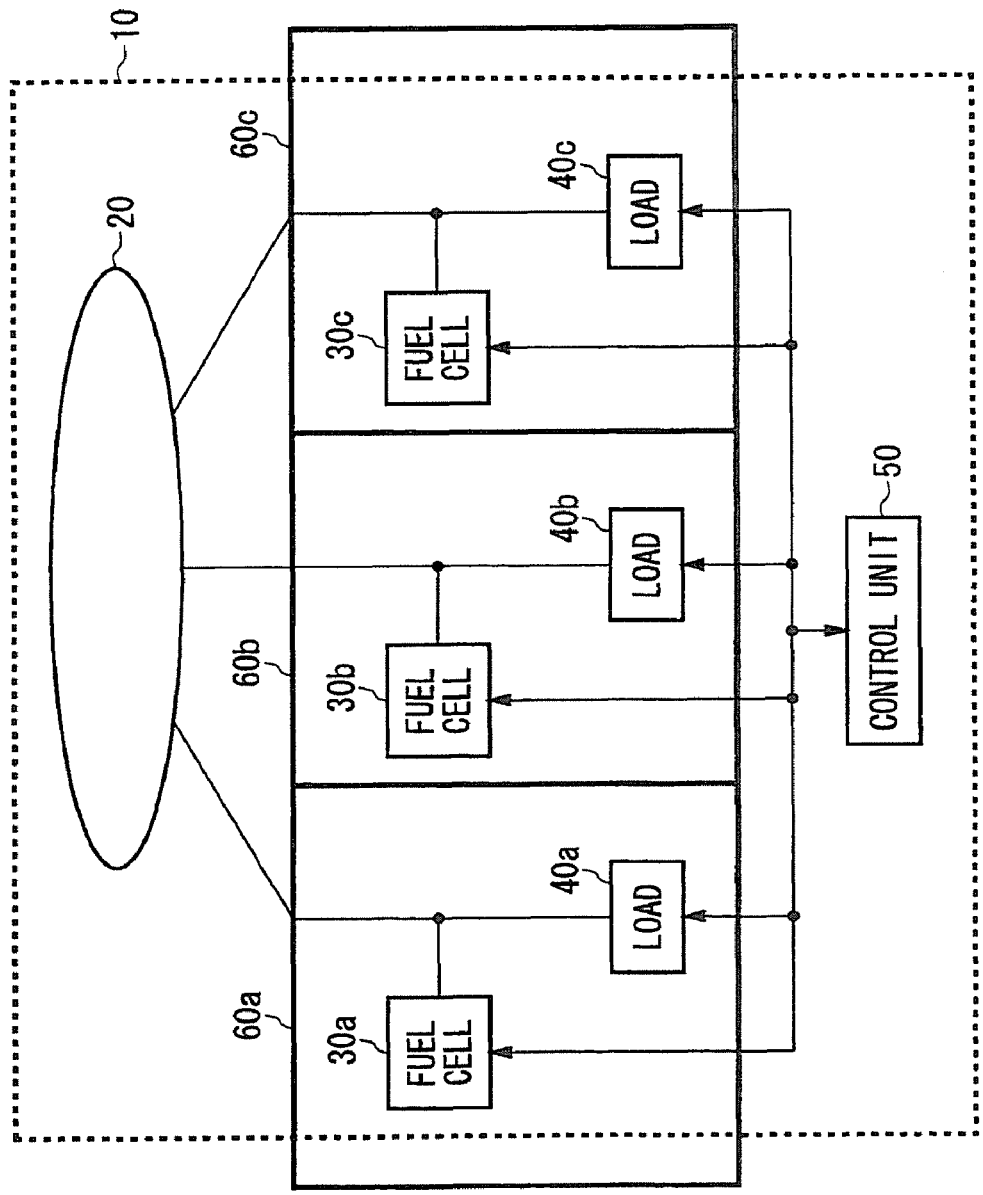
FIG. 1 shows an example of the configuration of a multiple dwelling 100 according to an exemplary embodiment of the present invention.

FIG. 1 shows an example of the configuration of a multiple dwelling 100 according to an exemplary embodiment of the present invention. The multiple dwelling 100 includes a plurality of dwelling units (60a to 60c) and a power supply system 10. The power supply system 10 supplies power to a plurality of loads (40a to 40b) provided in the plurality of dwelling units (60a to 60c).

The power supply system 10 includes a plurality of fuel cells (30a to 30c), a power network 20, and a control unit 50. The plurality of fuel cells (30a to 30c), each of which is provided to correspond to the plurality of loads (40a to 40c), generates and supplies power to the corresponding loads (40a to 40c). Each of the fuel cells (30a to 30c) may generate power according to the power to be consumed by the corresponding loads (40a to 40c) or a predetermined amount of power.

The power network 20, which is coupled to the plurality of the fuel cells (30a to 30c), receives surplus power, which is generated by the plurality of the fuel cells (30a to 30c) except the power supplied to the corresponding loads (40a to 40c). Moreover, the power network 20 supplies the surplus power received to the loads (40a to 40c) short of power. That is, the power network 20 receives the surplus power from any of the fuel cells (30a to 30c), which generate power more than that consumed by the corresponding loads (40a to 40c), and supplies power to any of the loads (40a to 40c), which consume power more than that generated by the corresponding fuel cells (30a to 30c).

Moreover, the control unit 50 controls the amount of power generated by each of the fuel cells (30a to 30c) so that the power generation efficiency of each of the fuel cells (30a to 30c) can be high. The control unit 50 will be described in detail hereinafter.

By the above configuration, each of the loads (40a to 40c) can be supplied with power from the plurality of fuel cells (30a to 30c), so it is possible to improve the reliability of power supply. For example, although any of the fuel cells (30a to 30c) cannot generate power due to a breakdown or maintenance, the loads (40a to 40c) can be supplied with power from the corresponding fuel cells.

Moreover, it is extremely rare that all of the loads (40a to 40c) needs the maximum power (peak power) at the same time, so when one of the loads (40a to 40c) consumes the peak power, the fuel cells (30a to 30c) corresponding to the other loads (40a to 40c) may make up for the power of the load. Accordingly, even if all of the fuel cells (30a to 30c) cannot generate the peak values of the power consumed by the corresponding loads (40a to 40c), power supply can be stably performed. According to this embodiment, by coupling the plurality of fuel cells (30a to 30c) to each other, it is possible to reduce the total power generation capacity of the plurality of fuel cells (30a to 30c). Accordingly, it is possible to provide a low-cost power supply system, of which the reliability of power supply is high even if it is disconnected to the system. Therefore, it is possible to provide the power supply system with high reliability at low cost even in the places where it is geographically difficult to be in connection with the system or the cost for the communication is high, e.g. isolated islands.

Moreover, the total power generation capacity of the plurality of fuel cells (30a to 30c) is given by $C \times N$, where C is the power generation capacity of each of the fuel cells (30a to 30c) and N is the number of the fuel cells (30a to 30c) provided. The probability in case that the power supply is insufficient is represented by $EM(N) > C \times N \times (1-R)$, where R is the probability of the breakdown of the fuel cells (30a to 30c) and EM(N) indicates the maximum total power consumed by the plurality of loads (40a to 40c). In this embodiment, it is preferable that the power generation capacity and the number of the fuel cells (30a to 30c) provided should be set so that the probability in case that the power supply is insufficient is less than the probability in case that the power generation of the system stops. Accordingly, it is possible to have the reliability of power supply equal to the system or higher.

Figure 2:
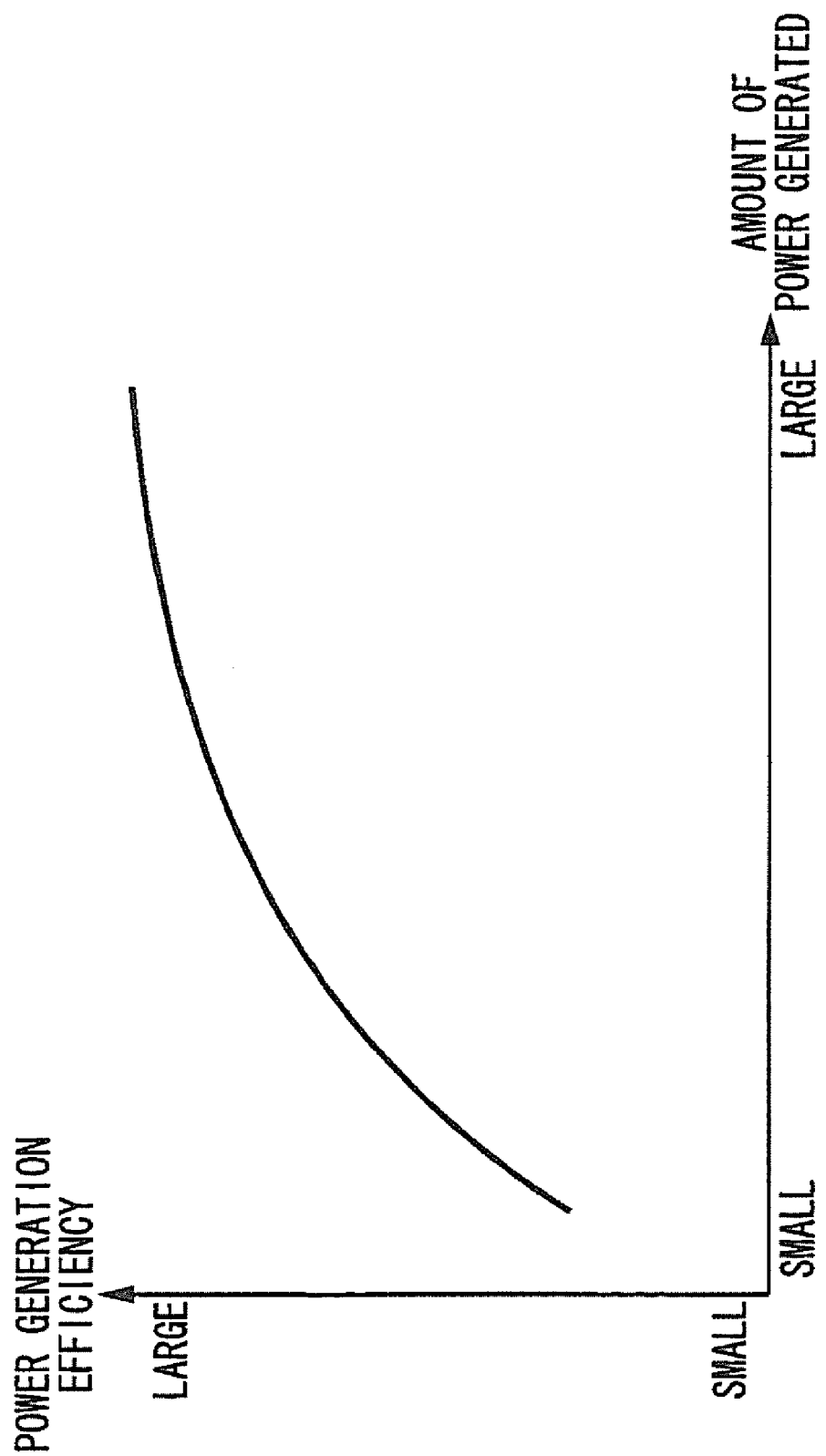
FIG. 2 shows an example of the power generation efficiency of the fuel cells (30a to 30c).

FIG. 2 shows an example of the power generation efficiency of the fuel cells (30a to 30c). In FIG. 2, the horizontal axis represents the amount of the power generated by the fuel cells and the vertical axis represents the power generation efficiency of the fuel cells. As shown in FIG. 2, the power generation efficiency increases according to the amount of the power generated. Accordingly, it is preferable that the control unit 50 controls the fuel cells (30a to 30c) in such a manner that each of the fuel cells (30a to 30c) generates power more than a predetermined amount.

Figure 3A:
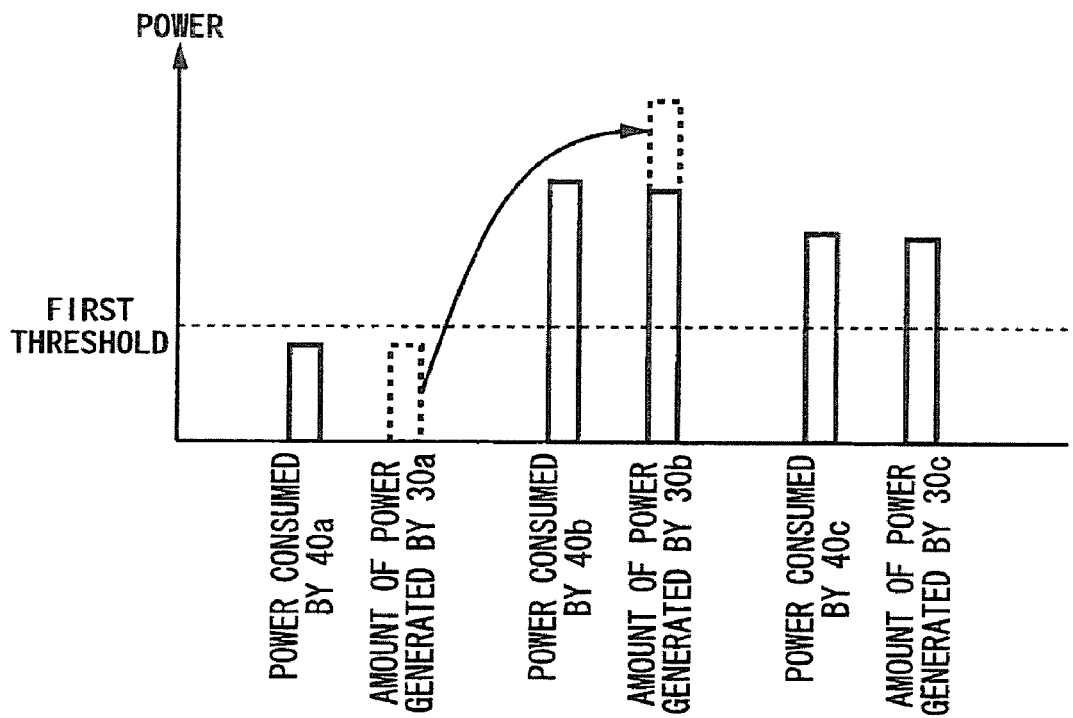
FIGS. 3A and 3B show an example of the power consumed by the loads (40a to 40c).
Figure 3B:
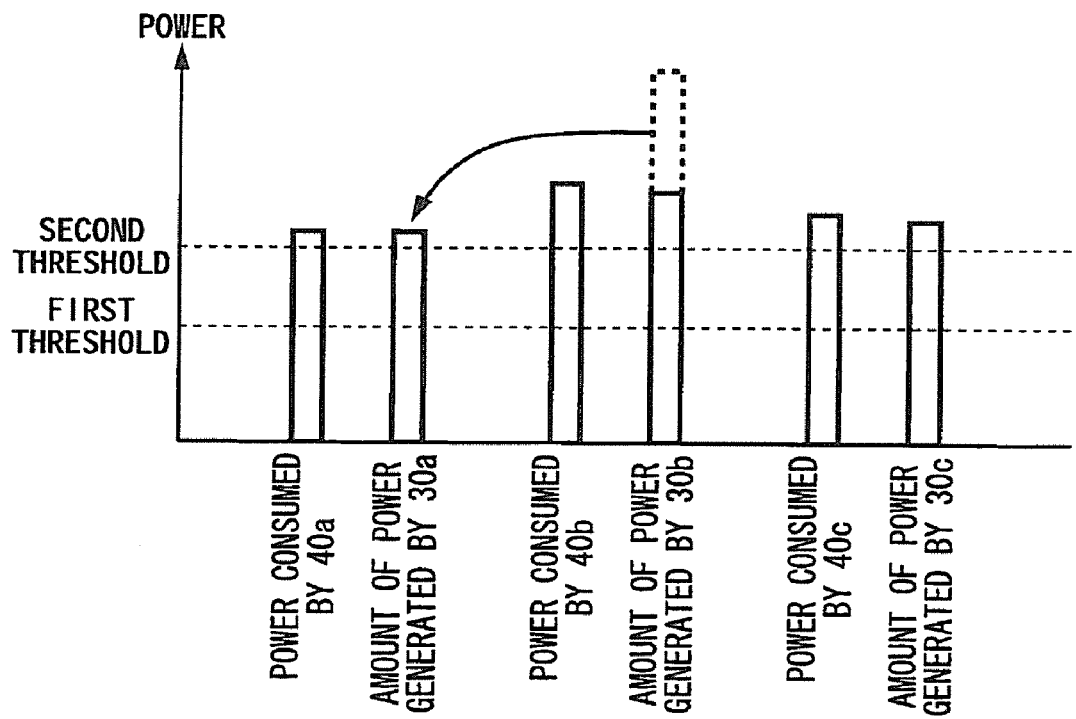

FIGS. 3A and 3B show an example of the power consumed by the loads (40a to 40c). Although the fuel cells (30a to 30c) generate power according to the power consumed by the corresponding loads (40a to 40c), the power generation efficiency of the fuel cells (30a to 30c) is low in a region where the amount of power generated is small as shown in FIG. 2.

As shown in FIG. 3A, when the amount of the power to be supplied to one of the loads 40a, that is, the power consumed by the load 40a is less than a predetermined first threshold, the control unit 50 stops the power generation of the fuel cell 30a corresponding to the load 40a and controls other fuel cells (30b and 30c) to generate the power to be supplied to the load 40a as the surplus power. In this case, the control unit 50 may select one or more fuel cells (the fuel cell 30b in this embodiment 30b) capable of generating the power to be supplied among other fuel cells (30b and 30c) on the basis of a sequence that a fuel cell, of which amount of power generated is large, is first selected, and control the fuel cell(s) to perform power generation. Accordingly, it is possible to prevent the fuel cells (30a to 30c) from generating power in the region where the efficiency is low and improve the power generation efficiency of the entire fuel cells (30a to 30c).

Moreover, as shown in FIG. 3B, when the amount of the surplus power supplied from the power network 20 to the load 40a corresponding to the fuel cell 30a, of which power generation has been stopped, that is, the power consumed by the load 40a is more than a predetermined second threshold greater than the first threshold, the control unit 50 may control the fuel cell 30a, of which power generation has been stopped, to generate the power to be supplied to the load 40a and stop other fuel cells (30b and 30c) from generating the surplus power. For example, in case of a load driven by the amount of power near the first threshold, if the stop/start of power generation of the fuel cells is determined only by the first threshold, the stop/start of power generation of the fuel cells is frequently repeated, thereby the power generation efficiency of the fuel cells becomes low. However, according to the example described in connection with FIG. 3, the repetition of the stop/start of power generation of the fuel cells (30a to 30c) is reduced, and thus the power generation efficiency of the fuel cells (30a to 30c) can be improved.

Moreover, when the average value of the power consumed by, for example, one of the loads 40a during a predetermined past period is less than the first threshold, the control unit 50 may stop the fuel cell 30a corresponding to the load 40a from generating power and controls other fuel cells (30b and 30c) to generate the power to be supplied to the load 40a as the surplus power. Moreover, when the average value of the surplus power supplied from the power-network 20 to the load 40a corresponding to the fuel cell 30a, of which power generation has been stopped, during a predetermined past period is less than the first threshold, the control unit 50 may control the fuel cell 30a, of which power generation has been stopped, to generate the power to be supplied to the load 40a and stop other fuel cells (30b and 30c) from generating the surplus power. Also in this case, the repetition of the stop/start of power generation of the fuel cells (30a to 30c) is reduced, and thus the power generation efficiency can be improved.

Moreover, the response of the fuel cell to the change of the power consumed is slow. Particularly, the response to the change of the power consumed while the load starts to be in operation might be slow. Accordingly, the control unit 50 may control, for example, the fuel cells (30b and 30c) corresponding to the loads (40b and 40c), which are already in operation, to generate power required for the load 40a to starts to be in operation as the surplus power. In this case, the control unit 50 may control the fuel cell 30a corresponding to the load 40a to generate the power to be supplied to the load 40a and stop other fuel cells (30b and 30c) from generating the surplus power from the time when a predetermined period elapses after the load 40a starts to be in operation. By this control, the response of power supply can be improved.

Moreover, when the amount of the power generated by one of the fuel cells (30a to 30c) is more than the power consumed by corresponding one of the loads (40a to 40c) during a predetermined past period as much as a predetermined value, the control unit 50 may decrease the amount of the power generated by the corresponding fuel cell. Moreover, when the average value of the power received by one of the loads (40a to 40c) from the power network 20 during a predetermined past period is more than a predetermined value, the control unit 50 may increase the amount of the power generated by corresponding one of the fuel cells (30a to 30c). In this way, by controlling the amounts of the power generated by the fuel cells (30a to 30c) based on the average values of power consumed during a predetermined past period, it is possible to control the changes of the amounts of the power generated by the fuel cells (30a to 30c) and perform stable power generation.

Moreover, the control unit 50 may select one or more 30 of the fuel cells (30a to 30c) capable of generating the total power consumed by the plurality of loads (40a to 40c) and control the fuel cell(s) selected to generate the total power consumed. That is, the control unit 50 selects one or more of the fuel cells (30a to 30c) capable of generating the total power consumed, when the fuel cell(s) to be selected generate power at the maximum efficiency. By this control, it is also possible to improve the power generation efficiency of the entire fuel cells (30a to 30c).

Figure 4:
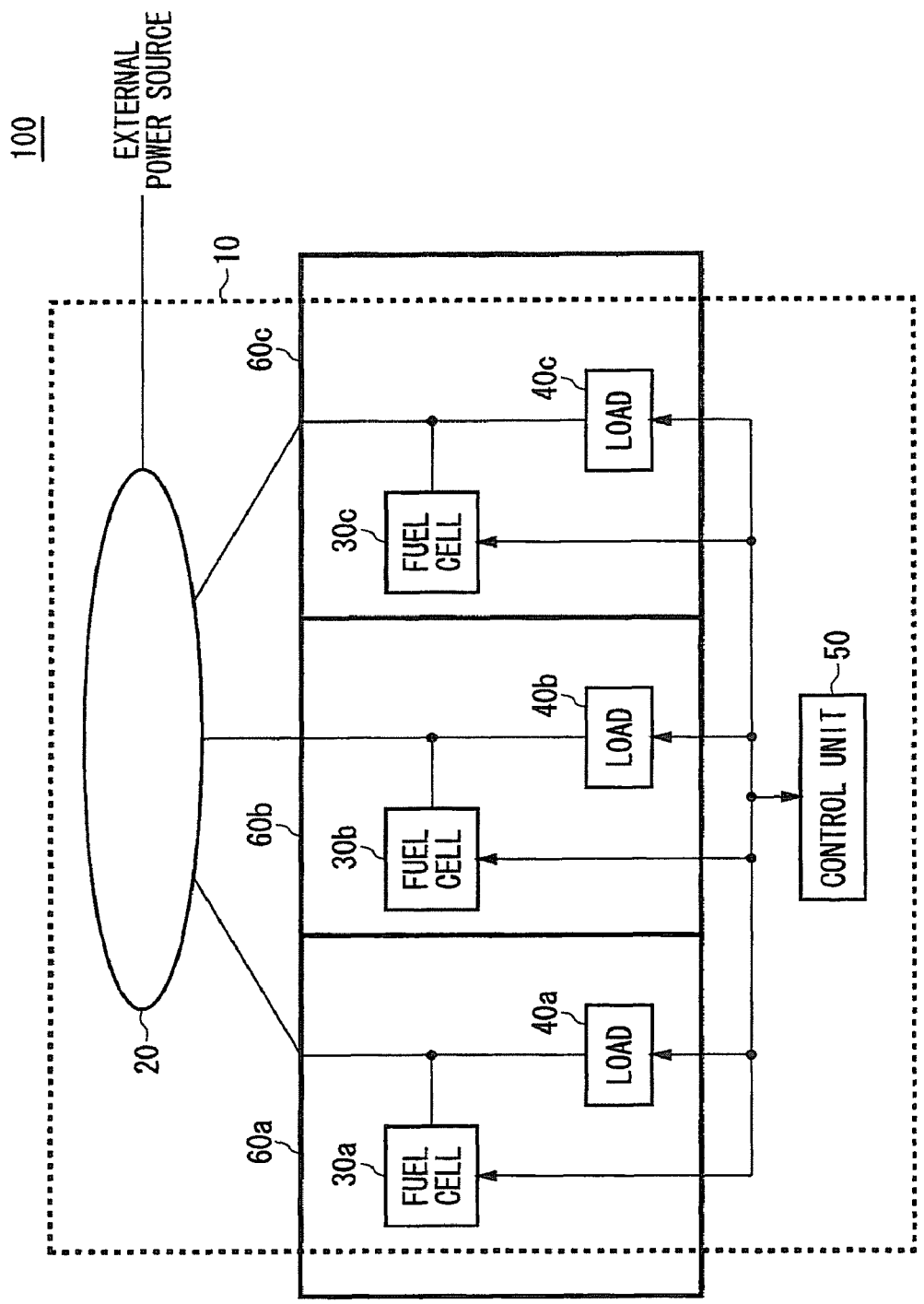
FIG. 4 shows another embodiment of the power supply system 10.

FIG. 4 shows another embodiment of the power supply system 10. In this embodiment, the power network 20 of the power supply system 10 is coupled to an external power source. When the total amount of the power consumed by the plurality of loads (40a to 40c) is more than the total power generation capacity of the plurality of fuel cells (30a to 30c), the power network 20 receives the insufficient power from the external power source and supplies it to the loads (40a to 40c).

Here, the external power source may be another power supply system 10 or a capacitor. If the external power source is another power supply system 10, the power networks 20 of the power supply systems 10 are coupled to each other and perform power transfer. In this way, as the power supply system 10 is coupled to another power supply system 10, the reliability of power supply can be further improved.

Moreover, if the external power source is a capacitor, the capacitor stores electric charge equivalent to a portion of the surplus power supplied from the fuel cells (30a to 30c) to the power network 20 except the power supplied to the loads (40a to 40c) and supplies the power stored to the plurality of loads (40a to 40c) when the total power needed by the plurality of loads (40a to 40c) is more than the total amount of the power generated by the plurality of fuel cells (30a to 30c). In the above configuration, the reliability of power supply can be further improved also. In this case, when the power stored in the capacitor is less than a predetermined value, it is preferable that the amount of the power generated by the plurality of fuel cells (30a to 30c) is increased and the power is stored in the capacitor. The control unit 40 may calculate the amount of the electric charge to be stored in the capacitor based on the total amount of the power generated by the plurality of fuel cells (30a to 30c) and the total amount of the power supplied to plurality of loads (40a to 40c) during a predetermined past period.

Figure 5:
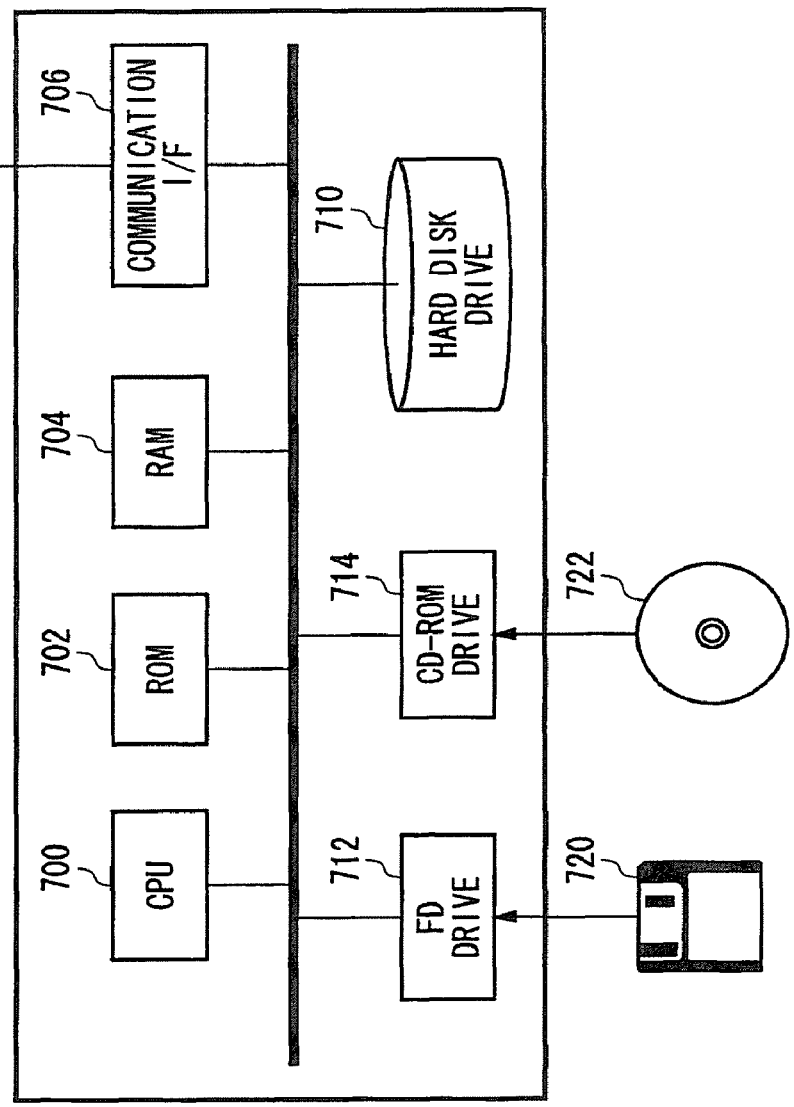
FIG. 5 shows an example of the configuration of a computer 200 for controlling the power supply system 10.

FIG. 5 shows an example of the configuration of a computer 200 for controlling the power supply system 10. In this embodiment, the computer 200 stores a computer program for instructing the power supply system 10 to function as described in connection with FIGS. 1 to 4. The computer 200 includes a CPU 700 a ROM 702, a RAM 704, a communication interface 706, a hard disk drive 710, a FD disk drive 712, and a CD-ROM drive 716. The CPU 700 operates based on the computer program stored in the ROM 702, the RAM 704, a hard disk 710, an FD disk 714 and/or a CD-ROM 718.

For example, the computer program instructing the power supply system 10 to function instructs the power supply system 10 to function as the power network 20, the plurality of fuel cells (30a to 30c) and the control unit 50 described in connection with FIGS. 1 to 4. Moreover, the computer 200 may function as the control unit 50 based on the computer program.

The communication interface 706 communicates with the power supply system 10. The hard disk drive 710 as an example of the storing device stores the setting information and the computer program for the operation of the CPU 700. The ROM 702, the RAM 704 and/or the hard disk drive 710 store the computer program instructing the power supply system 10 to function as described in connection with FIGS. 1 to 4. Moreover, the computer program may be stored in a flexible disk 720, a CD-ROM 722, a hard disk drive 710, etc.

The FD drive 712 reads the computer program from the flexible disk 714 and provides it to the CPU 700. The CD-ROM drive 706 reads the computer program from the CD-ROM 718 and provides it to the CPU 700.

Moreover, although the computer program is retrieved from a recording medium and transferred directly to the RAM to be performed, it may be retrieved and transferred to the RAM after being installed in the hard disk drive in advance. Further, the computer program may be stored in one recording medium or more. Moreover, the computer program stored in a recording medium may provide its functions together with an operating system. For example, the computer program may request the operating system to perform all or a part of the functions and provide its functions based on the response from the operating system.

As the recording medium for storing the computer program, there can be, in addition to the flexible disk, the CD-ROM, etc., an optical recording medium such as a DVD, a PD, etc., an electro-optical recording medium such as MD disc, a tape medium, a magnetic medium, and a semiconductor memory such as an IC card, a miniature card, etc.

In addition, a storage device such as a hard disc drive or RAM provided in a server system connected to a dedicated communication network or Internet may be used as the recording medium.

As obvious from the description above, according to the present invention, it is possible to provide a power supply system, in which the reliability of power supply is high and the cost is low, without connection with a system.

Although the present invention has been described by way of exemplary embodiments, it should be understood that those skilled in the art might make many changes and substitutions without departing from the spirit and the scope of the present invention which is defined only by the appended claims.

What is claimed is:

1. A power supply system for supplying power to a plurality of loads, comprising:

a plurality of fuel cells for generating and supplying power to be supplied to said respectively corresponding loads, wherein said fuel cells are provided to correspond to said plurality of loads;

a power network for receiving surplus power, which is generated by said fuel cells except power to be supplied to said loads corresponding to said fuel cells, and supplying said surplus power to said loads short of power, wherein said power network is coupled to said plurality of fuel cells; and a control unit for stopping power generation of a first fuel cell among said fuel cells corresponding to a first load among said loads and controlling other fuel cells among said fuel cells to generate power to be supplied to said first load as said surplus power via a power network, if an amount of power to be supplied to said first load is less than a predetermined first threshold.

2. The power supply system as claimed in claim 1, wherein said control unit controls said first fuel cell, of which power generation has been stopped, to generate power to be supplied to said first load and stops said other fuel cells from generating said surplus power if said surplus power supplied from said other fuel cells via said power network to said first load is more than a second threshold greater than said first threshold.

3. The power supply system as claimed in claim 1, wherein said control unit controls a fuel cell among said other fuel cells corresponding to a load among said loads, which is already in operation, to generate power as said surplus power required for the load, which is already in operation, among said loads to start to be in operation.

4. The power supply system as claimed in claim 3, wherein said control unit controls a fuel cell among said other fuel cells corresponding to said load, which is already in operation, and stops said fuel cell from generating said surplus power from said time when a predetermined period elapses after said load starts to be in operation.

5. The power supply system as claimed in claim 1, wherein said control unit stops power generation of said first fuel cell and controls said other fuel cells to generate power to be supplied to said first load as said surplus power, if an average amount of power consumed by said first load during a predetermined past period is less than said first threshold.

6. The power supply system as claimed in claim 1, wherein said control unit decreases an amount of power generated by said first fuel cell if said amount of power generated by said first fuel cell is more than an average amount of power that has been consumed by said first load during a predetermined past period.

7. The power supply system as claimed in claim 1, wherein said control unit increases an amount of power generated by said first fuel cell if an average amount of power that has been received by said first load from said other fuel cells via said power network during a predetermined past period is more than a predetermined value.

8. The power supply system as claimed in claim 1 further comprising a capacitor for storing electric charge equivalent to a portion of said surplus power supplied to said power network except power supplied to said loads and supplying said power stored to said loads if a total amount of power required by said plurality of loads is more than a total amount of power which can be generated by said plurality of fuel cells, wherein said control unit increases said amount of power generated by said plurality of fuel cells if said power stored by said capacitor is less than a predetermined value.

9. The power supply system as claimed in claim 1, wherein power generation efficiency of said plurality of fuel cells increases according to an amount of power generated by said plurality of fuel cells.

10. A non-transitory computer readable medium storing instructions for instructing a power supply system to supply power to a plurality of loads, wherein said power supply system comprises:
- a plurality of fuel cells for generating and supplying power to be supplied to said respectively corresponding loads, wherein said fuel cells are provided to correspond to said plurality of loads;
- a power network for receiving surplus power, which is generated by said fuel cells except power to be supplied to said loads corresponding to said fuel cells, and supplying said surplus power to said loads short of power, wherein said power network is coupled to said plurality of fuel cells; and
- a control unit for stopping power generation of a first fuel cell among said fuel cells corresponding to a first load among said loads and controlling other fuel cells among said fuel cells to generate power to be supplied to said first load as said surplus power via a power network, if an amount of power to be supplied to said first load is less than a predetermined first threshold.

11. A non-transitory computer readable medium as claimed in claim 10, wherein power generation efficiency of said plurality of fuel cells increases according to an amount of power generated by said plurality of fuel cells.

12. A multiple dwelling provided with a plurality of dwelling units, comprising:
- a plurality of fuel cells for generating and supplying power to be supplied to said respectively corresponding dwelling units, wherein said fuel cells are provided to correspond to said plurality of dwelling units;
- a power network for receiving surplus power, which is generated by said fuel cells except power to be supplied to said dwelling units corresponding to said fuel cells, and supplying said surplus power to said dwelling units short of power, wherein said power network is coupled to said plurality of fuel cells; and
- a control unit for stopping power generation of a first fuel cell among said fuel cells corresponding to a first dwelling unit among said dwelling units and controlling other fuel cells among said fuel cells to generate power to be supplied to said dwelling unit as said surplus power via a power a network, if an amount of power to be supplied to said first dwelling unit is less than a predetermined first threshold.

13. The multiple dwelling as claimed in claim 12, wherein power generation efficiency of said plurality of fuel cells increases according to an amount of power generated by said plurality of fuel cells.

* * * * *